US006607236B2

(12) United States Patent
Mooy et al.

(10) Patent No.: US 6,607,236 B2

(45) Date of Patent: Aug. 19, 2003

(54) DOOR SUPPORT SYSTEM

(75) Inventors: Robert H. Mooy, Alliston (CA); Bradley F. Patzer, Barrie (CA)

(73) Assignee: Ventra Group Inc., Bradford (CA)

( * ) Notice: Subject to any disclaimer, the term of this patent is extended or adjusted under 35 U.S.C. 154(b) by 0 days.

(21) Appl. No.: 10/090,670

(22) Filed: Mar. 6, 2002

(65) Prior Publication Data

US 2003/0102692 A1 Jun. 5, 2003

Related U.S. Application Data

(60) Provisional application No. 60/335,820, filed on Dec. 5, 2001.

(51) Int. Cl.⁷ ........................................ B60J 5/00

(52) U.S. Cl. ......................... 296/146.11; 16/85; 16/321

(58) Field of Search ....................... 296/146.11; 16/321, 16/85, 342

(56) References Cited

U.S. PATENT DOCUMENTS

| | | | | |
|---|---|---|---|---|
| 3,461,481 A | | 8/1969 | Bachmann | |
| 3,584,333 A | | 6/1971 | Hakala | |
| 3,643,289 A | | 2/1972 | Lohr | |
| 3,965,531 A | | 6/1976 | Fox et al. | |
| 4,332,056 A | | 6/1982 | Griffin et al. | |
| 4,408,799 A | | 10/1983 | Bowman | |
| 4,579,201 A | | 4/1986 | Tiedeman | |
| 4,628,568 A | | 12/1986 | Lee et al. | |
| 4,788,743 A | | 12/1988 | Okumura | |
| 4,829,633 A | | 5/1989 | Kassner | |
| 5,165,509 A | | 11/1992 | Kanno et al. | |
| 5,346,272 A | | 9/1994 | Priest et al. | |
| 5,410,777 A | | 5/1995 | Gruber | |
| 5,456,283 A | | 10/1995 | Schap | |
| 5,566,048 A | * | 10/1996 | Esterberg et al. | 16/342 |
| 5,752,293 A | * | 5/1998 | Lowry et al. | 16/342 |
| 5,878,463 A | | 3/1999 | Kluting et al. | |
| 5,913,350 A | | 6/1999 | Kluting | |
| 5,920,960 A | | 7/1999 | Kluting | |
| 5,966,776 A | | 10/1999 | Ona | |
| 6,029,314 A | | 2/2000 | Kluting et al. | |
| 6,065,185 A | | 5/2000 | Breed et al. | |
| 6,073,309 A | | 6/2000 | Kluting et al. | |
| 6,446,308 B1 | * | 9/2002 | Brewington et al. | 16/337 |

FOREIGN PATENT DOCUMENTS

| | | |
|---|---|---|
| DE | 2230885 | 12/1972 |
| DE | 3822382 A | 1/1990 |
| DE | 4103198 A | 9/1992 |
| DE | 4212181 A | 10/1993 |
| WO | WO 00/42280 | 7/2000 |

* cited by examiner

*Primary Examiner*—Dennis H. Pedder

(74) *Attorney, Agent, or Firm*—Pillsbury Winthrop LLP

(57) ABSTRACT

A door support system for supporting a vehicle door on a vehicle body for movement in opening and closing directions includes a door hinge system and an infinite door check system. The door hinge system includes a pair of first mounting structures and a pair of second mounting structures pivotally coupled to provide for movement of the vehicle door relative to the vehicle body. The infinite door check system includes first and second one-way check devices. The first one way check device applies a biasing force to resist movement of the vehicle door in the closing direction, and the second one way check device applies a biasing force to resist movement of the vehicle door in the opening direction. Each of the check devices includes a biasing structure that provide the biasing force and a clutch that enables or disables the application of the biasing force to the vehicle door.

22 Claims, 11 Drawing Sheets

DOOR SUPPORT SYSTEM

The present application claims priority to U.S. Provisional Application of Mooy et al., Ser. No. 60/335,820, filed Dec. 5, 2001 the entirety of which is hereby incorporated into the present application by reference.

FIELD OF THE INVENTION

The present invention relates to a door support system for supporting a vehicle door on a vehicle body for movement in opposing opening and closing directions. More particularly, the present invention relates to an infinite door check system of the door support system for controlling opening and closing movements of the vehicle door relative to the vehicle body.

BACKGROUND OF THE INVENTION

A conventional door check system typically comprises an elongated link member having detents that are engaged by spring-biased rollers or sliders to releasably hold a motor vehicle door in a predetermined open position. This prevents unwanted swinging of the door until sufficient force is applied to the door to overcome the spring biasing of the rollers or sliders. However, the link member has only one or two detents such that the door may be held in only one or two predetermined open positions.

An infinite door check system of the type herein contemplated is advantageous because the system enables the user to secure the door in any desired position. PCT Application EP 00/00159 discloses an infinite door check system including a mechanical switching unit that can assume different positions. In general, the unit comprises a thrust washer, an upper and lower lifting washer having depressions facing one another, balls received between the upper and lower lifting washers in the depressions thereof, a thrust ring, and a stack of alternating first and second braking disks. When no force is exerted on the door, the balls are situated in the lowest points of the depressions and a spring force exerted on the thrust washer is transmitted through the upper lifting washer and the thrust ring to the stack of braking disks. Compression of the stack of disks produces a frictional connection between the vehicle door and the vehicle body, thus securing them against relative rotational movement with respect to each other. When the vehicle door is pivoted with respect to the vehicle body, the pivoting movement causes the thrust washer to be rotated. This rotational movement is transmitted to the upper lifting washer, which in turn causes the upper lifting washer to be rotated relative to the lower lifting washer. The balls received between the lifting washers rise in their depressions, which causes an increase in the distance between the lifting washers. Because of this increase in distance, the connection between the upper lifting washer and the thrust ring is interrupted, thus relieving the frictional connection between the stack of first and second braking disks. As a result, the vehicle door may rotate freely with respect to the vehicle body.

The switching unit described above has several disadvantages. One disadvantage is the number of small parts. This makes assembly more difficult and enhances the opportunity to lose parts. Another disadvantage is the excessive wear in the depressions within the upper and lower lifting washers due to their interaction over time with the balls. This results in impeding the relative movement between the lifting washers and the unit will not function properly.

SUMMARY OF THE INVENTION

It is an object of the present invention to provide an improved door check system. In accordance with the principles of the present invention, this objective is achieved by providing a door support system for supporting a vehicle door on a vehicle body for movement in opposing opening and closing directions. The door support system includes a door hinge system and an infinite door check system. The door hinge system includes (a) a pair of first mounting structures constructed and arranged to be mounted to one of the vehicle door and the vehicle body in spaced apart relation, and (b) a pair of second mounting structures constructed and arranged to be mounted to the other of the vehicle door and the vehicle body in spaced apart relation. The first mounting structures and the second mounting structures are pivotally coupled to support the vehicle door and provide for the movement of the vehicle door relative to the vehicle body in the opening and closing directions. The infinite door check system includes first and second one-way check devices. Each of the check devices includes a first frictional brake structure fixed with respect to the pair of first mounting structures and a second frictional brake structure positioned adjacent the first brake structure and movable relative to the first frictional brake structure.

A stressed biasing element applies a braking force to the first and second brake structures. The first and second brake structures provide braking surfaces engaged with one another such that the application of the braking force to the brake structures by the stressed biasing element creates a braking friction between the braking surfaces to resist relative movement between the first and second frictional brake structures. A clutch is movable between (a) an engaged position operatively coupling the second brake structure and the pair of second mounting structures for movement together so that the braking friction prevents relative movement between the first and second mounting structures absent application of force sufficient to overcome the braking friction, and (b) a released position wherein the second brake structure is decoupled from the second mounting structures to enable the first and second mounting structures to pivot relative to one another substantially free from resistance by the braking friction.

The clutch of the first one-way infinite check device is constructed and arranged to remain in the engaged position as the first and second mounting structures are pivoted relative to one another in a direction corresponding to the opening direction of the door for a predetermined angular distance and to then responsively move to the released position. The clutch responsively moves to the released position during relative pivotal movement between the first mounting structure and the second mounting structure in a direction corresponding to the closing direction of the door.

The clutch of the second one-way infinite check device is constructed and arranged to remain in the engaged position as the first and second mounting structures are pivoted relative to one another in a direction corresponding to the closing direction of the door for a predetermined angular distance and to then responsively move to the released position. The clutch responsively moves to the released position during relative pivotal movement between the first mounting structure and the second mounting structure in the direction corresponding to the opening direction of the door.

In another aspect of the present invention, the objective may be achieved by providing a door support system for supporting a door on a body for movement in opposing opening and closing directions. The door support system includes a door hinge system and an infinite door check system. The door hinge system includes (a) a pair of first mounting structures constructed and arranged to be mounted to one of the door and the body in spaced apart relation, and (b) a pair of second mounting structures constructed and arranged to be mounted to the other of the door and the body in spaced apart relation. The first mounting structures and the second mounting structures are pivotally coupled to support the door and provide for the movement of the door relative to the body in the opening and closing directions.

The infinite door check system includes first and second one-way check devices. Each of the check devices includes a drive structure fixed with respect to the one of the pair of first mounting structures and the pair of second mounting structures. A pivot structure is mounted for pivotal movement in opposing first and second directions relative to the other of the pair of first mounting structures and the pair of second mounting structures. A biasing structure is connected between the other of the pairs of mounting structures and the pivot structure. The biasing structure is constructed and arranged to apply a biasing force to the pivot structure to resist relative pivotal movement between pivot structure and the other of the pairs of mounting structures. A clutch is movable between (a) an engaged position operatively coupling the drive structure and the pivot structure for movement together so that the biasing force resists relative movement between the pair of first mounting structures and the pair of second mounting structures by virtue of the drive structure being fixed with respect to the one of the pairs of mounting structures, the biasing force resisting relative pivotal movement between the pivot structure and the other of the pairs of mounting structures, and (b) a released position wherein the pivot structure is decoupled from the drive structure to enable the drive structure and the pivot structure to pivot relative to one another substantially free from resistance by the biasing force.

The biasing structure of the first check device applies its biasing force against a pivotal movement of the pivot structure relative to the one of the pairs of mounting structures in a direction corresponding to the closing direction of the door. The clutch of the first check device is constructed and arranged to remain in the engaged position as the first and second mounting structures are pivoted relative to one another in the direction corresponding to the closing direction of the door. The clutch responsively moves to the released position upon the first and second mounting structures being pivoted relative to one another a predetermined angular distance in the direction corresponding to the closing direction of the door against the biasing structure of the first check device.

The biasing structure of the second check device applies its biasing force against a pivotal movement of the pivot structure relative to the one of the pairs of mounting structures in a direction corresponding to the opening direction of the door. The clutch of the second check device is constructed and arranged to remain in the engaged position as the first and second mounting structures are pivoted relative to one another in the direction corresponding to the opening direction of the door. The clutch responsively moves to the released position upon the first and second mounting structures being pivoted relative to one another a predetermined angular distance in the direction corresponding to the opening direction of the door against the biasing structure of the second check device.

These and other objects, features, and advantages of this invention will become apparent from the following detailed description when taken into conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF PREFERRED EMBODIMENTS

Figure 1:
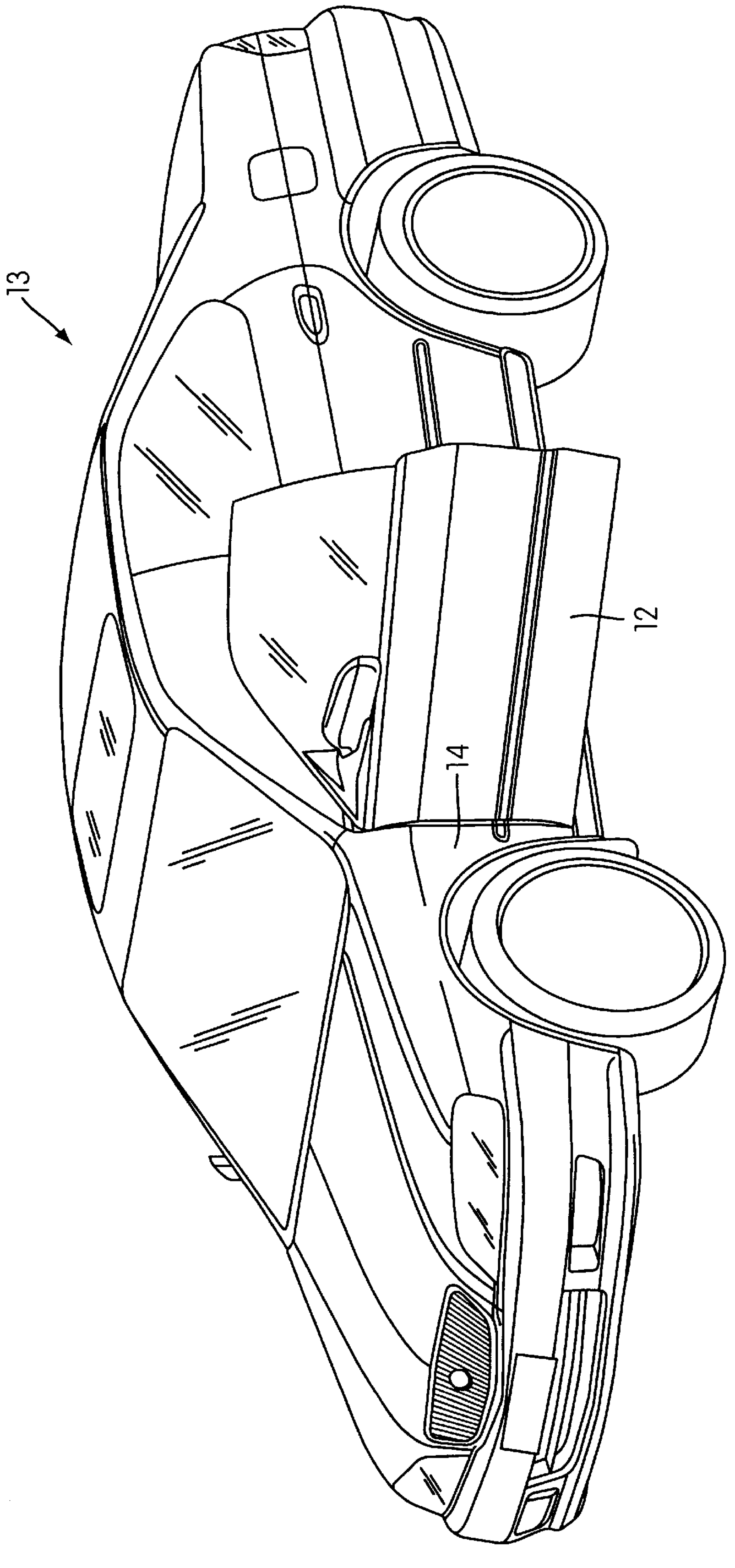
FIG. 1 is a perspective view of a motor vehicle utilizing a door support system constructed in accordance with the principles of the present invention.
Figure 2:
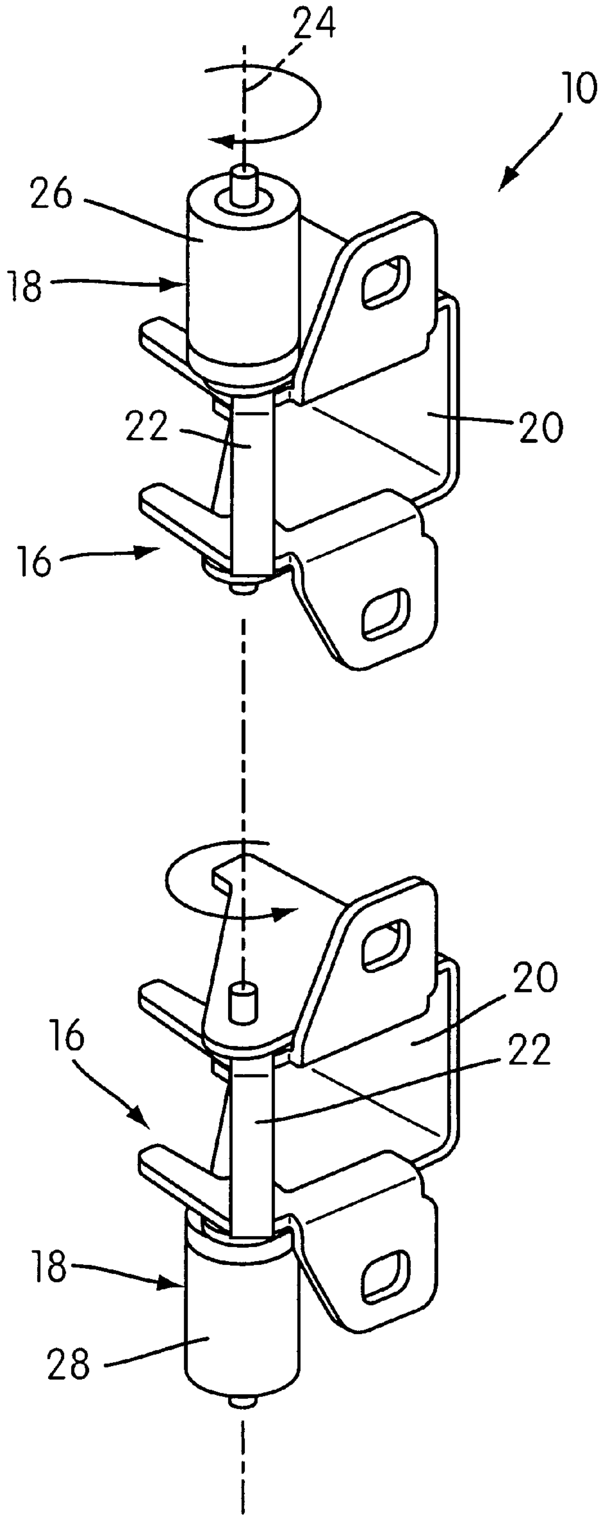
FIG. 2 is a perspective view of the door support system constructed in accordance with the principles of the present invention.

FIG. 2 shows a door support system, shown generally at 10, for supporting a motor vehicle door 12 on a motor vehicle body 14 (shown in FIG. 1) for movement in opposing opening and closing directions. The construction of a motor vehicle, generally shown at 13 in FIG. 1, and the door 12 and the body 14 thereof are conventional and thus will not be detailed herein. Instead, the present invention is concerned with the door support system 10.

Referring now more particularly to FIG. 2, the door support system 10 comprises a door hinge system 16 and an infinite door check system 18.

The door hinge system 16 includes a pair of first mounting structures 20 and a pair of second mounting structures 22 that are pivotally coupled such that the first and second mounting structures 20, 22 are pivotable relative to one another about a pivotal axis 24. In the illustrated embodiment, the first mounting structures 20 are constructed and arranged to be mounted to the vehicle body 14 in spaced apart relation and the second mounting structures 22 are constructed and arranged to be mounted to the vehicle door 12 in spaced apart relation. The first mounting structures 20 and the second mounting structures 22 are pivotally coupled together to support the vehicle door 12 and provide for the movement of the vehicle door 12 relative to the vehicle body 14 about the pivotal axis 24 in the opening and closing directions. These mounting structures 20, 22 may have any suitable construction for connection to the vehicle door 12 and the vehicle body 14, and the specific constructions disclosed herein are only intended to be illustrative.

The mounting structures 20, 22 are referred to as "first" and "second" mounting structures to reflect the fact that the door hinge system 16 may be installed either by mounting the first mounting structures 20 to the vehicle door 12 and the second mounting structures 22 to the vehicle body 14 or by mounting the first mounting structures 20 to the vehicle body 14 and the second mounting structures 22 to the vehicle door 12. In the illustrated embodiment, the first mounting structures 20 are body mounting brackets constructed and arranged to be mounted to the vehicle body 14 and the second mounting structures 22 are door mounting brackets constructed and arranged to be mounted to the vehicle door 12.

Figure 3:
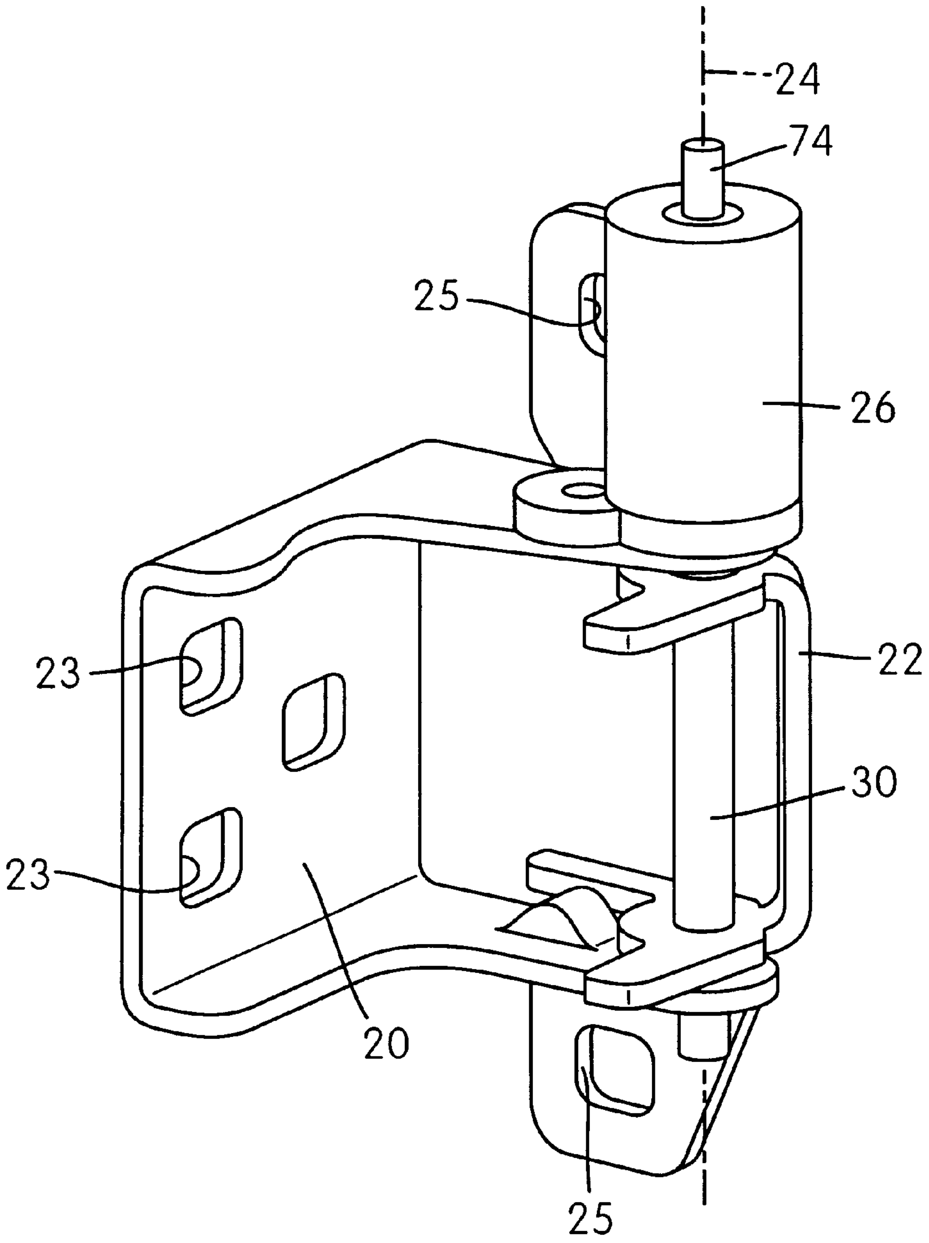
FIG. 3 is a perspective view of an upper one of the first and second mounting structures and door check device thereof.

Referring to FIG. 3, which shows an enlarged view of an upper one of the body and door mounting brackets 20, 22, each body mounting bracket 20 includes a plurality of fastener receiving openings 23 formed therethrough, preferably by stamping. Fasteners, such as bolts, are inserted through the openings 23 to secure each body mounting bracket 20 to the vehicle body 14. Each door mounting bracket 22 includes a plurality of fastener receiving openings 25 formed therethrough, preferably by stamping. Fasteners, such as bolts, are inserted through the openings 25 to secure each door mounting bracket 22 to the vehicle door 12. Alternatively, these openings 23, 25 may be omitted and the body and door mounting brackets 20, 22 may be mounted to the door and vehicle body by welding or in any other suitable manner.

The infinite door check system 18 controls opening and closing movements of the vehicle door 12 relative to the vehicle body 14. As shown in FIG. 2, the infinite door check system 18 comprises first and second one-way check devices 26, 28. In the illustrated embodiment, the first one-way check device 26 is coupled to one of the upper body and door mounting brackets 20, 22 and the second one-way check device 28 is coupled to one of the lower body and door mounting brackets 20, 22.

Because the first and second one-way check devices 26, 28 are similar to one another, an understanding of the configuration of one will suffice for an understanding of both.

Referring to FIGS. 3–6, each door mounting bracket 22 includes a drive structure in the form of a shaft 30 fixed thereon about the pivotal axis 24 of the body and door mounting brackets 20, 22. Specifically, the shaft 30 has spaced apart knurled portions 32 thereon. Each knurled portion 32 includes a series of ridges along the outer periphery of the shaft 30. Upper and lower arms 34, 36 of the door mounting bracket 22 have holes 38, 40 therethrough to accommodate the shaft 30. The shaft 30 is inserted through the holes 38, 40 such that the knurled portions 32 are aligned with and press-fitted within respective holes 38, 40 to prevent relative pivotal movement of the door mounting bracket 22 with respect to the shaft 30. That is, these knurled portions 32 fix the shaft 30 to the door mounting bracket 22 so that they pivot together, as seen best in FIG. 4.

Figure 4:
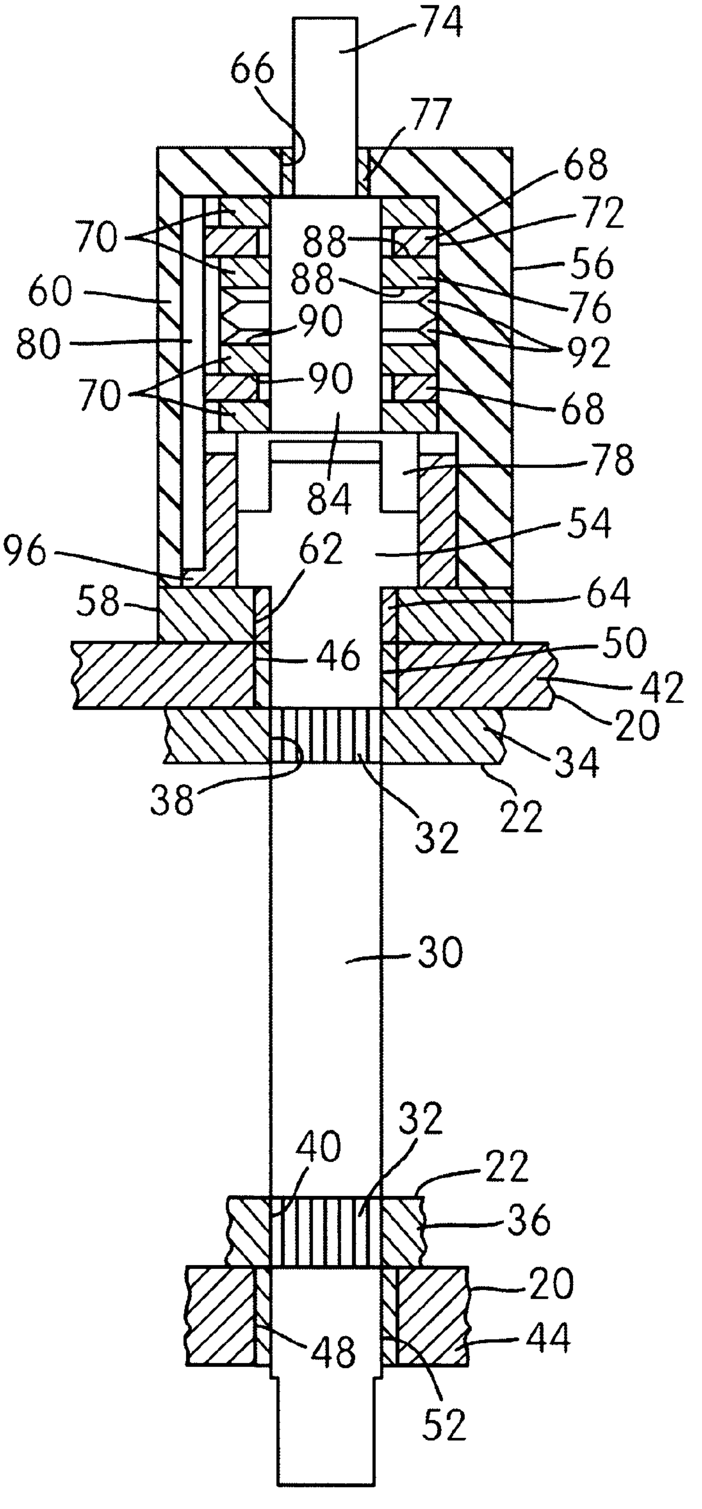
FIG. 4 is a cross-sectional view illustrating the components of the door check device.

Upper and lower arms 42, 44 of the body mounting bracket 20 also have holes 46, 48 therethrough to accommodate the shaft 30, as seen best in FIG. 4. Bushings 50, 52 are inserted in respective holes 46, 48 of the body mounting bracket 20 for supporting the shaft 30 and reducing frictional wear/noise during pivotable movement of the shaft 30, and hence the door mounting bracket 22, relative to the body mounting bracket 20 about the pivotal axis 24.

Each shaft 30 includes a clutch hub 54 fixed thereon or formed integrally therewith, as will be further discussed.

Each door check device 26, 28 includes a housing 56 fixed to the body mounting bracket 20. The housing 56 includes a disk-shaped base 58 and a cylindrical body 60. The base 58 is mounted in position, by welding or any fastener, to the upper arm 42 of the body mounting bracket 20. The base 58 includes a hole 62 therethrough which is aligned with the hole 46 of the upper arm 42 in order to accommodate the shaft 30. A bushing 64 is inserted in the hole 62 to support the shaft 30 and reduce frictional wear/noise during pivotable movement of the shaft 30 relative to the housing 56. The cylindrical body 60 has one end closed by being fixedly mounted to the base 58. The opposite end of the body 60 is generally covered by an end wall with a hole 66 therethrough.

Figure 5:
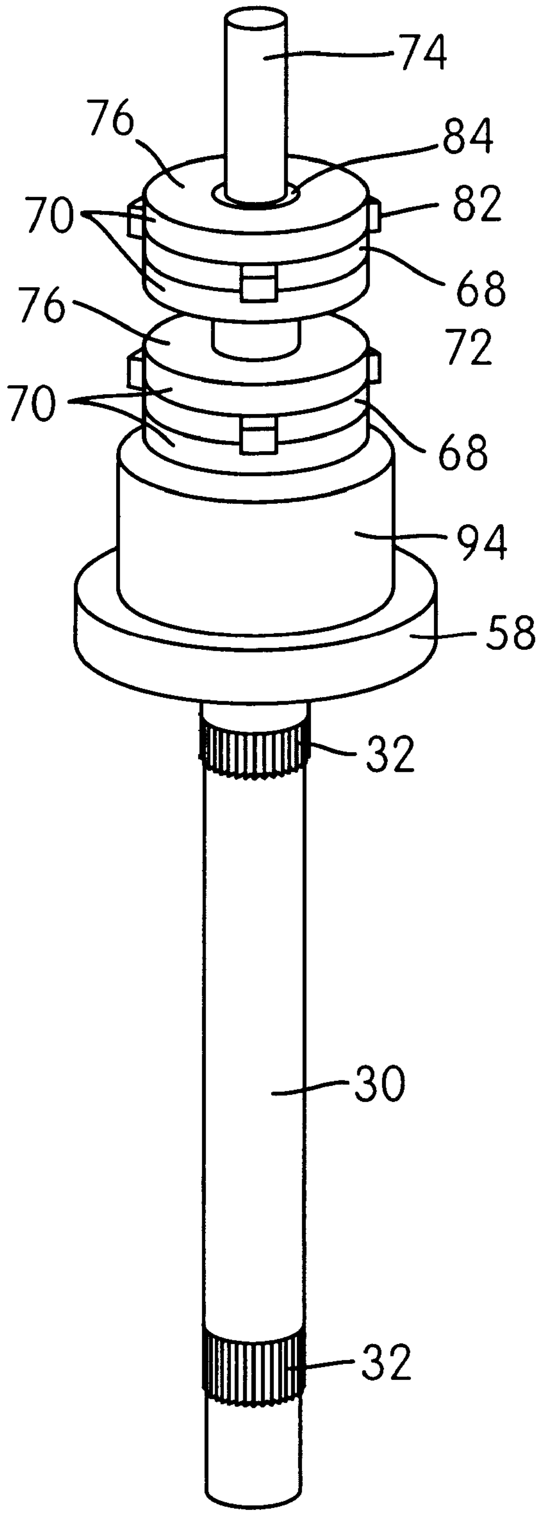
FIG. 5 is a perspective view of the door check device with the housing removed.
Figure 6:
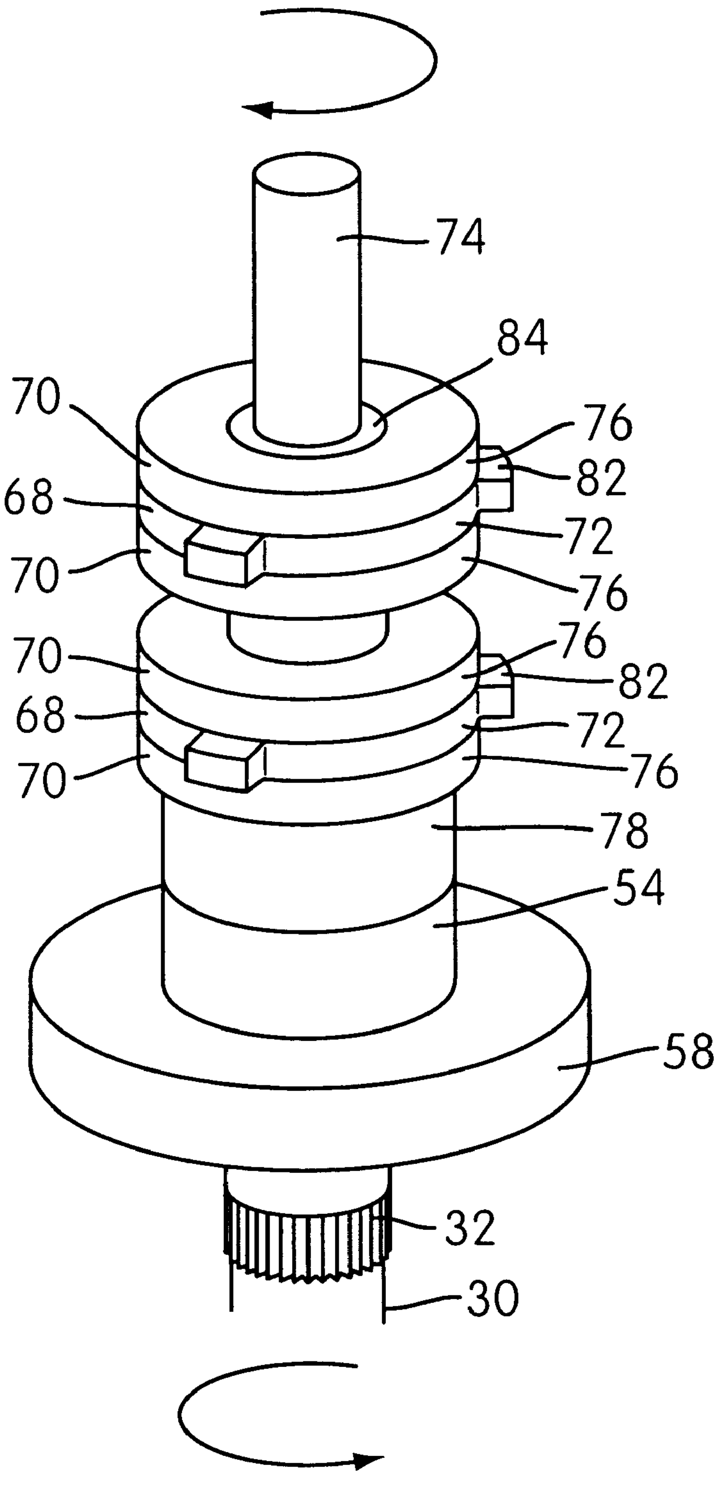
FIG. 6 is an enlarged perspective view of the door check device with the housing removed.

As seen best in FIGS. 4–6, each door check device 26, 28 includes a first frictional brake structure 68 fixed with respect to the body mounting bracket 20 and a second frictional brake structure 70 positioned adjacent the first brake structure 68 and movable relative to the first brake structure 68. Both brake structures 68, 70 are received within the housing 56. In the illustrated embodiment, the first brake structure 68 includes one or more first braking plates 72 fixed with respect to the body mounting bracket 20. The second brake structure 70 includes a pivot structure in the form of a brake shaft 74 on which one or more second brake plates 76 are fixedly mounted. A clutch hub 78 of the second brake structure 70 is also fixedly connected to or formed integrally with the brake shaft 74. A bushing 77 is inserted in the hole 66 of the body 60 for supporting the brake shaft 74 and reducing frictional wear/noise during pivotable movement of the brake shaft 74 relative to the housing 56. The clutch hub 78 of the brake shaft 74 is positioned into engagement with the clutch hub 54 of the shaft 30. The first and second brake structures 68, 70 may take any suitable form and thus should not be considered limited to the illustrative construction disclosed herein.

Figure 7:
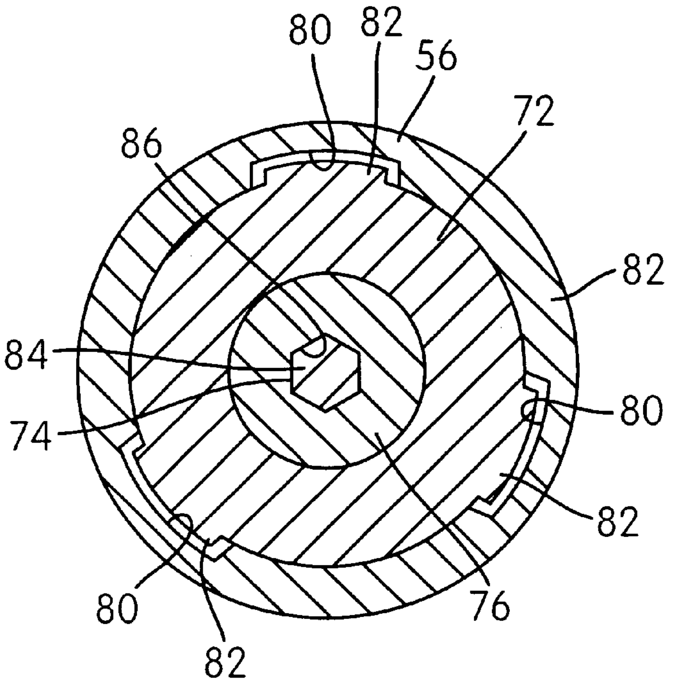
FIG. 7 is a cross-sectional view illustrating the first brake plates fixedly mounted to the housing.

As best shown in FIG. 7, the one or more first brake plates 72 are fixedly mounted within the housing 56. Specifically, the body 60 of the housing 56 has a plurality of grooves 80 on an interior thereof that extend generally parallel to the pivotal axis 24. Each of first brake plates 72 has a plurality of projections 82 on peripheral edges thereof received within the grooves 80 to fix the first brake plates 72 to the housing 56 and the body mounting bracket 20. Thus, relative pivotal movement is prevented between the housing 56 (and body mounting bracket 20) and the first brake plates 72 about the pivotal axis 24.

Figure 8:
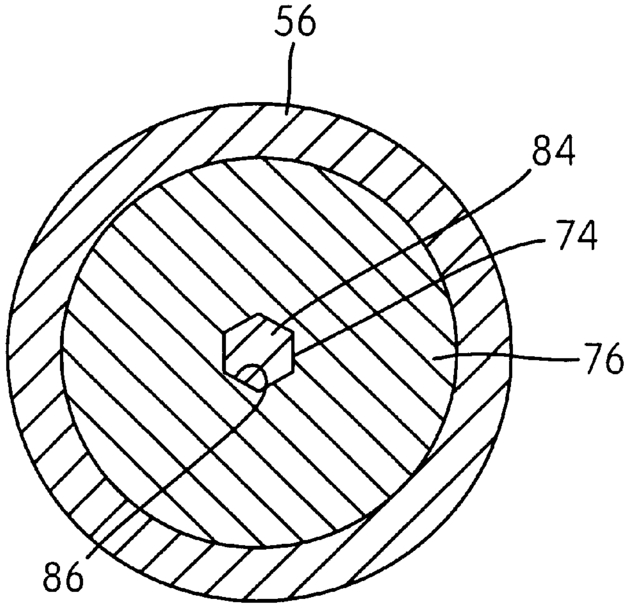
FIG. 8 is a cross-sectional view illustrating the second brake plates fixedly mounted to the brake shaft.

As best shown in FIG. 8, the brake shaft 74 has a portion 84 having a generally hexagonal cross-sectional geometry. Each of the second brake plates 76 has a hexagonal-shaped opening 86. The hexagonal portion 84 of the brake shaft 74 is received within the opening 86 to fix the second brake plates 76 to the brake shaft 74 and to prevent relative pivotal movement between the second brake plates 76 (and the door mounting bracket 22) and the brake shaft 74 about the pivot axis 24.

The use of projections 82 and grooves 80 for attaching the first brake plates 72 is exemplary and not intended to be limiting. Further, the geometry of the brake shaft 74 and opening 86 may be any polygon shape, or any other suitable construction. The invention encompasses any way of carrying the first and second plates 72, 76 on the housing 56 and brake shaft 74, respectively.

Each of the first brake plates 72 has an opposing pair of first braking surfaces 88 on opposing sides thereof. Each of the second brake plates 76 has an opposing pair of second braking surfaces 90 on opposing sides thereof. In the illustrated embodiment, the first and second brake plates 72, 76 are arranged in alternating manner and form two spaced apart stacks of brake plates. The first braking surfaces 88 and the second braking surfaces 90 of each stack of first and second braking plates 72, 76 face one another and are in engagement. The braking surfaces 88, 90 are provided by engaged major faces of the first and second brake plates 72, 76.

A stressed biasing element 92 is positioned within the space between the two stacks of brake plates 72, 76 so as to apply a braking force to the first and second brake structures 68, 70. In the illustrated embodiment, the stressed biasing element 92 includes one or more springs. Preferably, the stressed biasing element 92, as shown in FIG. 4, is one or more Belleville springs. However, the stressed biasing element 92 may be any other type of spring. The stressed biasing element 92 has one end engaged with a brake plate 76 of the upper stack and an opposite end engaged with a brake plate 76 of the lower stack.

The first and second brake structures 68, 70 provide braking surfaces 88, 90 engaged with one another such that the application of the braking force to the brake structures 68, 70 by the stressed biasing element 92 creates a braking friction between the braking surfaces 88, 90 to resist relative pivotal movement between the first and second frictional brake structures 68, 70, and hence the brake shaft 74 and housing 56.

Thus, the two stacks of brake plates 72, 76 produce a static friction moment due to their material coefficient of friction and the compressive load applied by the spring 92. This static friction moment is referred to as the check load.

Each door check device 26, 28 includes a clutch 94 that is movable between an engaged position and a released position. In the engaged position, the clutch 94 operatively couples the second brake structure 70 and the door mounting bracket 22 for movement together so that the braking friction prevents relative movement between the body and door mounting brackets 20, 22 absent application of force sufficient to overcome-the braking friction. In the released position, the second brake structure 70 is decoupled from the door mounting bracket 22 to enable the body and door mounting brackets 20, 22 to pivot relative to one another substantially free from resistance by the braking friction.

As aforesaid, the second.brake structure 70 includes the clutch hub 78 and the shaft 30 includes the clutch hub 54. In the illustrated embodiment, the clutch 94 is a torsion spring which in the engaged position frictionally embraces the clutch hubs 54, 78 to couple the shaft 30 to the brake shaft 74. Specifically, the torsion spring 94, in the engaged position, is biased radially inwardly such that inner peripheral surfaces of the torsion spring 94 frictional engage the clutch hubs 54, 78 as shown in FIG. 4. As a result, the shaft 30 and the brake shaft 74 will pivot together and are subject to the resistance created by the brake structures 68, 70. Thus, the braking resistance will resist pivotal movement of the shaft 30 and in turn the door mounting bracket 22. In other words, because the brake structures 68, 70 retard pivoting between the shafts 30, 74 and the housing. 56, the brake structures 68, 70 also retard pivotal movement between the body and door mounting brackets 20, 22 and hence the vehicle body 14 and the vehicle door 12.

The torsion spring 94 includes two tang members. One tang member 96, as shown in FIGS. 4 and 9–12, is received within one of the grooves 80 in the housing 56. The tang member 96, as will be further discussed, is configured and positioned to deactivate the torsion spring 94,.which uncouples the shaft 30 from the brake shaft 74. The other tang member 97 is received within another one of the grooves 80 and is configured and positioned to maintain the relative position of the torsion spring 94 within the housing 56, so that the amount of rotation required to deactivate the torsion spring 94 remains constant.

Operation of the infinite door check system 18 will now be described in greater detail. The infinite door check system 18 provides an opposing resistive force, i.e. check load, of a preset magnitude to the vehicle door 12 so as to prevent the vehicle door 12 from rotating. This check load can be applied at any position within the door travel. The operator must apply a force greater than the preset check load, at which point the infinite door check system 18 disengages, and allows the vehicle door 12 to continue to rotate with only a minimal amount of resistive torque. Once the vehicle door stops rotating, the infinite door check system 18 is engaged, and once again the operator must apply a force greater than that of the preset check load to initiate motion. Thus, the infinite door check system 18 prevents unwanted movement of the vehicle door 12 relative to the vehicle body 14 due to wind or gravity, for example.

In the illustrated embodiment, the infinite door check system 18 includes first and second one way check devices 26, 28. The first one way check device 26 provides a rotational check load for movement of the vehicle door 12 in one direction, and the second one way check device 28 provides a rotational check load for movement of the vehicle door 12 in the other direction. For example, the first one way check device 26 may provide a check load for movement of the vehicle door 12 in the opening direction, and the second one way check device 28 may provide a check load for movement of the vehicle door 12 in the closing direction.

Figure 9:
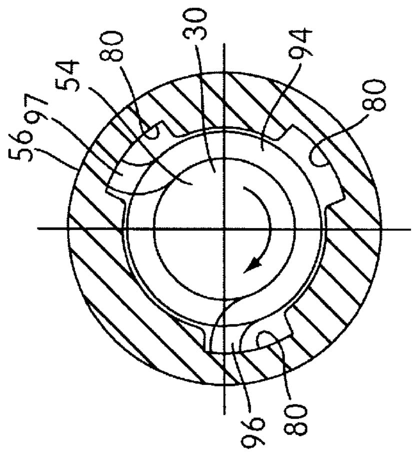
FIG. 9 is a cross-sectional view illustrating the relation between the clutch, the shaft, and the housing during rotation of the vehicle door in one direction.

For example, input torque, applied by the operator to rotate the vehicle door 12, is transferred from the vehicle door 12 to the door mounting bracket 22, to the drive shaft 30, to the brake shaft 74 and the second brake plates 76 via the torsion spring 94, and then to the first brake plates 72. Once the input torque exceeds the check load (i.e., static friction moment of the first and second brake plates 72, 76), relative movement begins between the first and second brake plates 72, 76, and hence the shafts 30 and 74 and the housing 56, as shown in FIG. 9.

Specifically, the clutch hub 54 of the shaft 30 has a slightly larger outside diameter than the outside diameter of the clutch hub 78 of the brake shaft 74. As a result, the torsion spring 94 engages or grips the clutch hub 54 and is slightly spaced or lightly engaged with the clutch hub 78 when the vehicle door 12 is stationary or checked. Once an input torque is applied to move the vehicle door 12 in one direction, the torsion spring 94 is configured to move to the engaged position and frictionally embrace both clutch hubs 54, 78 to couple the shaft 30 to the brake shaft 74. In particular, because the spring 94 is a torsion spring, the frictional contact of the hub 54 during rotation will cause the spring 94 to contract, thus coupling clutch hub 54 to clutch hub 78. However, movement of the vehicle door 12 in the other direction causes the torsion spring 94 to rotate with the clutch hub 54 of the shaft 30 relative to the clutch hub 78 of the brake shaft 74, as will be further discussed.

Figure 10:
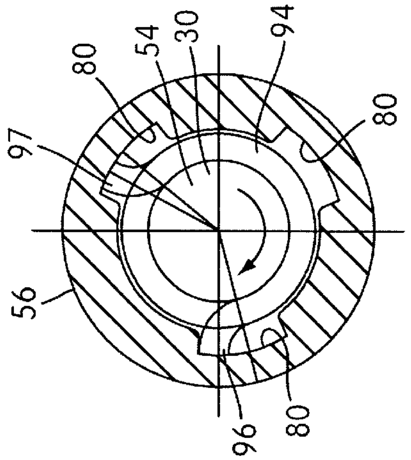
FIG. 10 is a cross-sectional view illustrating the relation between the clutch, the shaft, and the housing during further rotation of the vehicle door in one direction.

As aforesaid, the torsion spring 94 has one tang member 96 which is received within one of the grooves 80 in the housing 56. Once relative movement between the shafts 30 and. 74 and the housing 56 in the opening direction has started as indicated by the arrow in FIG. 9, the tang member 96 of the torsion spring 94 engages against the end of the respective groove 80 in the housing 56, which in turn deactivates the torsion spring 94. Specifically, the tang member 96 is forced against the respective groove 80 which expands the torsion spring 94 radially outwardly, against the bias thereof, such that the inner peripheral surfaces of the torsion spring 94 disengage from the clutch hubs 54, 78 of the shafts 30 and 74, as shown in FIG. 10. With the torsion spring 94 deactivated, the shaft 30 is uncoupled from: the brake shaft 74 so that the shaft 30, and hence the door mounting bracket 22 and vehicle door 12 thereof, rotates in the direction indicated by the arrow in FIG. 10 independent of the brake shaft 74, and no check load is applied. Although no check load is applied, there will be a small amount of friction between the spring 94 and the clutch hub 54. This friction provides a small amount of resistance, referred to as a running torque, which helps to control the swinging of the door. However, this resistance is not enough to check the door against movement and thus is not considered a check load. Once rotation of the vehicle door 12 is discontinued, the tang member 96 of the torsion spring 94 is no longer forced against the respective groove 80, and the torsion spring 94 is once again able to be coupled with the shaft 30 and the brake shaft 74 via clutch hubs 54 and 78. When the operator tries again to rotate the vehicle door 12 in the same direction, the operator must first overcome the check load and the door check device performs in the same manner as it did for the first rotation segment.

Figure 11:
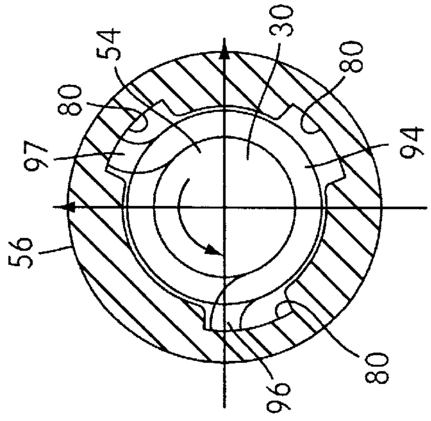
FIG. 11 is a cross-sectional view illustrating the relation between the clutch, the shaft, and the housing during rotation of the vehicle door in an opposite direction.
Figure 12:
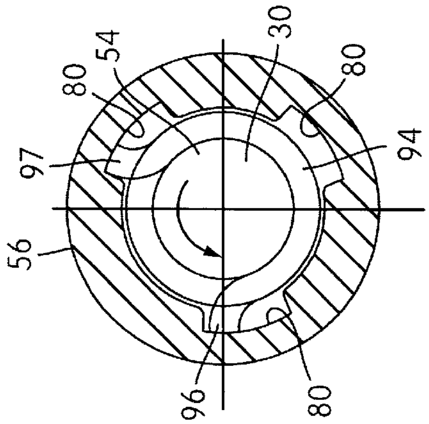
FIG. 12 is a cross-sectional view .illustrating the relation between the clutch, the shaft, and the housing during further rotation of the vehicle door in the opposite direction.

Specifically, this sequence of rotating, stopping, then rotating again, can occur any number of times within the door swing. The door check system 18 will provide a check load each time the vehicle door 12 stops rotation, hence the term infinite check. The torsion spring 94 does not couple the shaft 30 to the brake shaft 74 when rotated in the opposite direction to that which produces a check load. This is a physical characteristic of the torsion spring 94. Specifically, rotation of the vehicle door in the opposite direction rotates the shaft 30 and torsion spring 94 engaged therewith relative to the brake shaft 74 (due to the torsion spring's grip on the clutch hub 54 of the shaft 30 which has a slightly larger outside diameter than the clutch hub 78 of the brake shaft 74), which results in no check load being applied, as shown in FIG. 11. Continued rotation of the vehicle door forces the tang member 97 against the respective groove 80 in the housing 56, as shown in FIG. 12, which expands the torsion spring 94 radially outwardly, against the bias thereof, such that the torsion spring 94 disengages the clutch hub 54 of the shaft 30 and the vehicle door to ensure that no check load applied. Similar to the above, there will be a small amount of friction between the spring 94 and the clutch hub 54. This friction provides a small amount of resistance, referred to as a running torque, which helps to control the swinging of the door. Moreover, the tang member 97 prevents further movement of the torsion spring 94 in the opposite direction in order to space the tang member 96 a predetermined distance from the end of the respective groove so as to maintain the relative position of the torsion spring 94 within the housing 56. As a result, the amount of rotation required to deactivate the torsion spring 94 remains generally constant. Thus, this explains the advantage of providing first and second door check devices 26, 28, one to provide a check load for the opening direction and one to provide a check load for the closing direction.

The same door check device can be utilized to provide a check load for both the opening and closing directions simply by altering the mounting configuration between the upper and lower one of the body and door mounting brackets 20, 22, i.e. pointing upwards or pointing downwards as shown in FIG. 2. Thus, the braking friction of the first one-way check device 26 inhibits opening movement of vehicle door 12 relative to the vehicle body 14 and the second one-way check device 28 inhibits closing movement of vehicle door 12 relative to the vehicle body 14.

In other words, the clutch 94, or torsion spring, of the first one-way infinite check device 26 is constructed and arranged to remain in the engaged position as the body and door mounting brackets 20, 22 are pivoted relative to one another in the opening direction of the vehicle door 12 for a predetermined angular distance and to then responsively move to the released position as a result of the tang member 96 engaging against the end of the respective groove 80. The clutch 94 is constructed and arranged to responsively move to the released position during relative pivotal movement between the body and door mounting brackets 20, 22 in the closing direction of the vehicle door 12.

Likewise, the clutch 94 of the second one-way infinite check device 28 is constructed and arranged to remain in the engaged position while the body and door mounting brackets 20, 22 are pivoted relative to one another in the closing direction of the vehicle door 12 for a predetermined angular distance and to then responsively move to the released position as a result of the tang member 96 engaging against the end of the respective groove 80. The clutch 94 is constructed and arranged to responsively move to the released position during relative pivotal movement between the body and door mounting brackets 20, 22 in the opening direction of the vehicle door 12.

Further, the clutch 94 of the first one-way infinite check device 26 is in the released position while the body and door mounting brackets 20, 22 are stationary and is constructed and arranged to responsively move to the engaged position upon initiation of the body and door mounting brackets 20, 22 in the direction corresponding to the opening direction of the door 12.

Likewise, the clutch 94 of the second one-way infinite check device 28 is in the released position while the body and door mounting brackets 20, 22 are stationary and is constructed and arranged to responsively move to the engaged position upon initiation of the body and door mounting brackets 20, 22 in the direction corresponding to the closing direction of the door 12.

However, the second one-way check device 28 may be configured to inhibit opening movement of vehicle door 12 and the first one-way check device 26 may be configured to inhibit closing movement of vehicle door 12.

Figure 13:
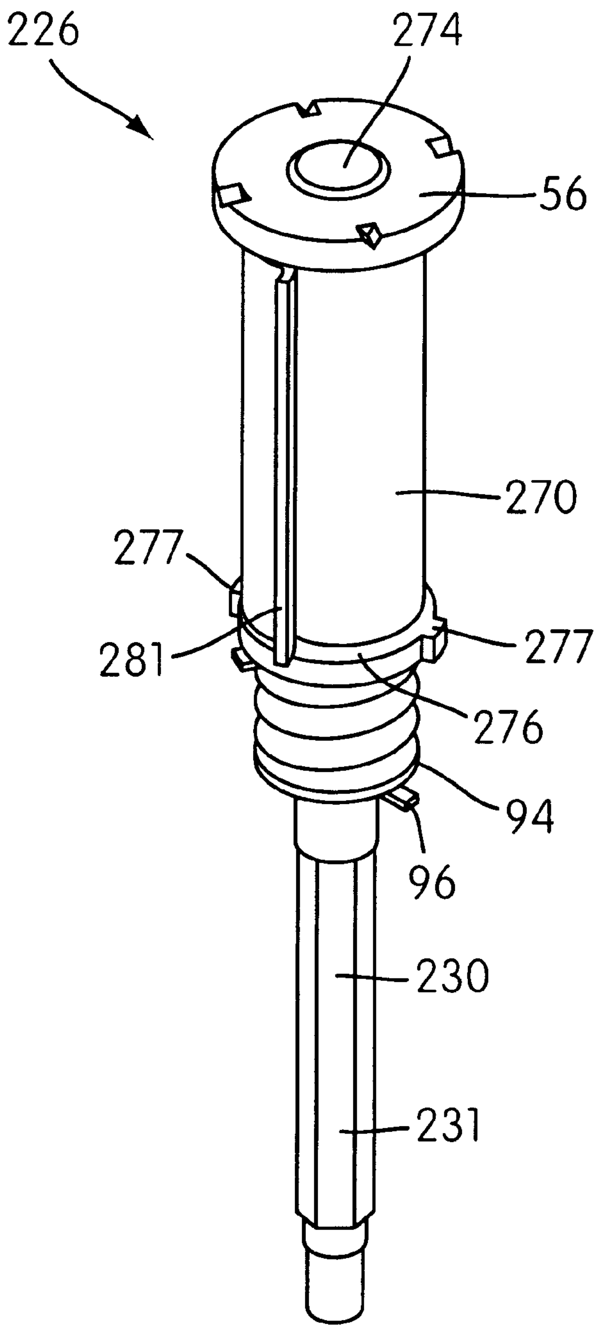
FIG. 13 is a perspective view of another embodiment of the door check device with the housing removed.
Figure 15:
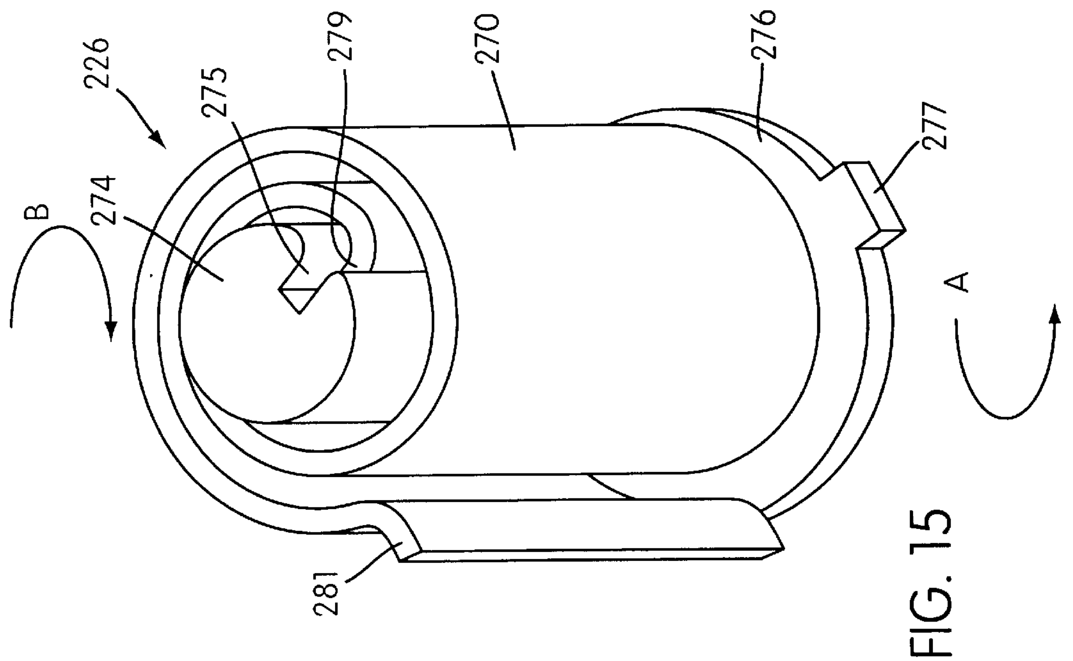
FIG. 15 is an enlarged perspective view of the door check device shown in FIG. 13 illustrating the spiral spring.
Figure 14:
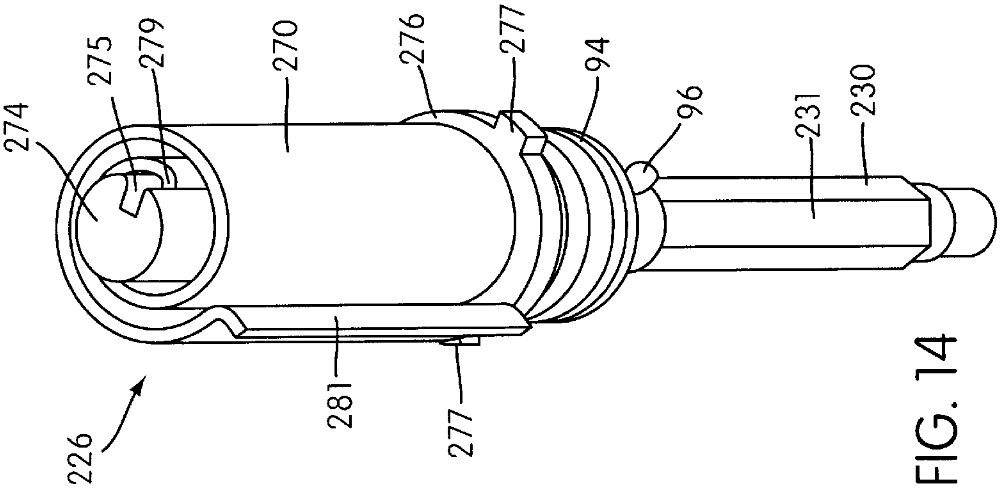
FIG. 14 is an enlarged perspective view of the door check device shown in FIG. 13 with the housing removed.

A further embodiment of the one-way check device, indicated as 226, is illustrated in FIGS. 13–15. Similar to the above one-way check devices 26, 28, the one-way check device 226 is paired with another similar one-way check device to provide first and second one-way check devices, which operate in opposite directions, for an infinite door check system. One of the one-way check devices may be coupled to one of the upper body and door mounting brackets 20, 22 and the other of the one-way check devices may be coupled to one of the lower body and door mounting brackets 20, 22. Because the first and second one-way check devices are similar to one another, an understanding of the configuration of the one-way check device 226 will suffice for an understanding of both.

In this embodiment, the one-way check device 226 includes a biasing structure in the form of a spiral spring 270 in place of the two stacks of brake plates 72, 76 and one or more Belleville springs 92 of the check devices 26, 28, as will be further discussed. As a result, the check device 226 can be easier to manufacture than the check devices 26, 28, which in turn can reduce manufacturing costs. The remaining elements of the check device 226 are similar to the elements of the check devices 26, 28 and are indicated with similar reference numerals.

FIGS. 13–14 illustrates the drive structure in the form of shaft 230 that is fixed to the door mounting bracket 22. In this embodiment, the shaft 230 has an intermediate portion 231 with a hexagonal cross-sectional geometry. The intermediate portion 231 of the shaft 230 is interlocked with hexagonal-shaped openings provided in the door mounting bracket 22 to prevent relative pivotal movement between the door mounting bracket 22 and the shaft 230. However, the geometry of the shaft 230 and openings in the door mounting bracket 22 may be any polygon shape, or any other suitable construction to prevent relative pivotal movement therebetween.

Figure 16:
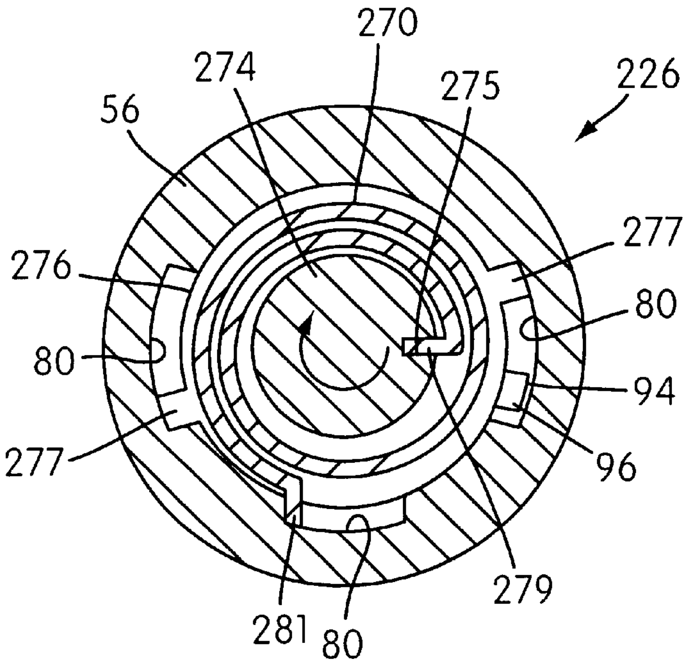
FIG. 16 is a cross-sectional view illustrating the relation between the clutch, the brake shaft, the spiral spring, and the housing during rotation of the vehicle door in one direction.
Figure 17:
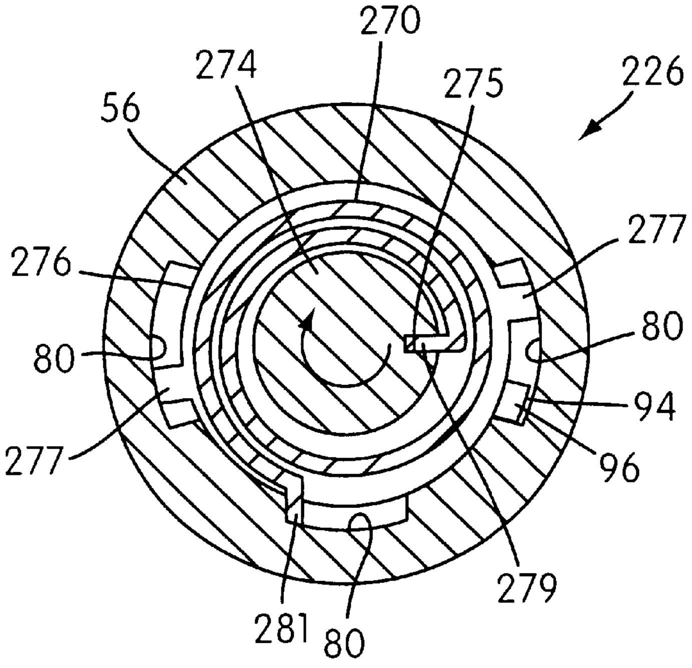
FIG. 17 is a cross-sectional view illustrating the relation between the clutch, the brake shaft, the spiral spring, and the housing during further rotation of the vehicle door in one direction.

The check device 226 includes a pivot structure in the form of shaft 274 that is mounted for pivotal movement in opposing first and second directions relative to the body mounting bracket 20. The shaft 274 includes an elongated slot 275 in which one leg of the spiral spring 270 is fixedly mounted. The shaft 274 also includes a plate 276 mounted thereon having a plurality of retaining projections 277 on peripheral edges thereof which are received within the grooves 80 of the housing 56, as shown in FIGS. 16 and 17. The retaining projections 277 provide stop surfaces to limit pivoted movement in the opposing first and second directions. The clutch hub (not shown) of the shaft 274, which is below the plate 276, is positioned into engagement with the clutch hub (not shown) of the shaft 230. Similar to the above, the clutch 94 operatively couples the shaft 230 and the shaft 274 via the clutch hubs for movement together.

As shown in FIGS. 14–17, the spiral spring 270 is installed within the housing 56 with a preload which produces the desired check load. Specifically, the spiral spring 270 includes a pair of retaining legs 279, 281. The spiral spring 270 is held in the preload position with one retaining leg 279 received within the slot 275 in the shaft 274 and the other retaining leg 281 and brake shaft retaining projections 277 received within respective grooves 80 in the housing 56. The spiral spring is preloaded to provide a resistive torque to resist relative pivotal movement between the shaft 274 and the shaft 230, and in turn prevents relative rotation between the body and door mounting brackets 20, 22, in turn providing a check load to the door 12.

In other words, the spiral spring 270 is preloaded such that the spiral spring 270 biases the shaft 274 in one direction illustrated by the arrow A in FIG. 15. Specifically, the spiral spring 270 applies a biasing force to the shaft 274 such that the retaining projections 277 are forced against respective grooves 80 within the housing 56, as shown in FIG. 16. This biasing force is the check load. As is discussed in further detail below, the operator must overcome the biasing force of the spiral spring 270 to rotate the shaft 274 in the opposite direction illustrated by the arrow B in FIG. 15 and the arrow in FIGS. 16 and 17.

Operation of the door check device 226 will now be described in greater detail. Input torque, applied by the operator to rotate the vehicle door 12, is transferred from the vehicle door 12 to the door mounting bracket 22, to the shaft all 230, to the shaft 274 via the torsion spring 94, and then to the spiral spring 270. Once the input torque exceeds the check load created by the spiral spring preload or biasing force, relative movement begins between the shafts 230 and 274 and the housing 56, as sequentially shown in FIGS. 16–17.

As described above with respect to the first illustrated embodiment, the torsion spring 94 has one tang member 96 which is received within one of the grooves 80 in the housing 56. Once relative movement between the shafts 230 and 274 and the housing 56 in the opening direction has started, the tang member 96 of the torsion spring 94 engages against the end of the respective groove 80 in the housing 56, which in turn deactivates the torsion spring 94, as shown in FIG. 17. With the torsion spring 94 deactivated, the shaft 230 is uncoupled from the shaft 274 so that the shaft 230, and hence the door mounting bracket 22 and vehicle door 12 thereof, rotates independent of the shaft 274, and no check load is applied. The shaft 274 will pivot back to the position shown in FIG. 16 as a result of the biasing force from the spiral spring 270. Although no check load is applied, there will be a small amount of friction between the spring 94 and the clutch hub of the shaft 230. This friction provides a small amount of resistance, referred to as a running torque, which helps to control the swinging of the door. However, this resistance is not enough to check the door against movement and thus is not considered a check load. Once rotation of the vehicle door 12 is discontinued, the tang member 96 of the torsion spring 94 is no longer forced against the respective groove 80, and the torsion spring 94 is once again couplable with the shaft 230 and the shaft 274. When the operator tries again to rotate the vehicle door 12, the operator must first overcome the check load and the door check device performs in the same manner as it did for the first rotation segment.

The torsion spring 94 does not couple the shaft 230 to the brake 274 when rotated in the opposite direction to that which produces a check load. This is a physical characteristic of the torsion spring 94, as discussed in detail above. This explains the need of providing first and second door check devices, one to provide a check load for the opening direction and one to provide a check load for the closing direction.

For example, the spiral spring 270 of the first check device applies its biasing force against pivotal movement of the shaft 274 relative to the body mounting bracket 20 in a direction corresponding to the closing direction of the door. Likewise, the spiral spring 270 of the second check device applies its biasing force against pivotal movement of the shaft 274 relative to the body mounting bracket 20 in a direction corresponding to the opening direction of the door.

It should be understood that the first and second door check devices 26, 28 (and 226) do not have to be similarly mounted between the vehicle door 12 and the vehicle body 14. As long as the components of each check device is arranged such that one of the check devices provides a check in one direction and the other of the check devices provides a check in the other direction. For example, one of the check devices may be installed by mounting the first mounting structure 20 to the vehicle door 12 and the second mounting structure 22 to the vehicle body 14 and the other check device may be installed by mounting the first mounting structure 20 to the vehicle body 14 and the second mounting structure 22 to the vehicle door 12. Further, the shaft 30 (and 230) may be fixed to either the first mounting structure 20 or the second mounting structure 22. Thus, the mounting arrangement of the hinge system 26 and the check devices 26, 28 (and 226) may be in any configuration as long as one of the check devices provides a rotational check load for movement of the vehicle door 12 in one direction, and the other of the check devices provides a rotational check load for movement of the vehicle door 12 in the other direction.

The infinite door check system 18 has several advantages over current door check devices. One advantage is that each door check device 26, 28 of the door check system 18 (including door check device 226 of an alternative embodiment) has fewer components than known door check devices, which results in easier assembly and an overall lower cost. Another advantage is that the door check devices 26, 28 (including door check device 226) do not require any maintenance or lubrication during the life of the part.

Further, the door check devices 26, 28 (including door check device 226) can be processed through regular OEM (original equipment manufacture) paint line processes, thus providing the vehicle door 12 with a door check device during this operation.

Moreover, as aforesaid, the same door check device can be utilized to provide a check load for both the opening and closing directions of the vehicle door simply by altering the mounting configuration between the upper and lower ones of the body and door mounting brackets.

The door check devices 26, 28 (including door check device 226) can be adapted and fitted to most commonplace stamped hinges, as a form of an integrated door check, and requires very little, if any, packaging modifications to the vehicle by the customer.

The door check devices have been configured for vehicle door hinges, but should not be limited to this use only. Potential alternate applications may include hood hinges and trunk hinges for vehicles. There are also potential applications outside of the automotive field, such as cabinet doors or window hinges. The door check devices may be adapted for most applications where a check load is required or desirable to prevent rotation. For greater clarity, any of these structures that open and close are considered to be within the meaning of the generic term "door."

It can thus be appreciated that the objectives of the present invention have been fully and effectively accomplished. The foregoing specific embodiments have been provided to illustrate the structural and functional principles of the present invention and is not intended to be limiting. To the contrary, the present invention is intended to encompass all modifications, alterations, and substitutions within the spirit and scope of the appended claims.

What is claimed:

1. A door support system for supporting a door on a body for movement in opposing opening and closing directions, said door support system comprising:

a door hinge system comprising (a) a pair of first mounting structures constructed and arranged to be mounted to one of the door and the body in spaced apart relation, and (b) a pair of second mounting structures constructed and arranged to be mounted to the other of the door and the body in spaced apart relation, said first mounting structures and said second mounting structures being pivotally coupled to support the door and provide for said movement of the door relative to the body in said opening and closing directions; and an infinite door check system comprising first and second one-way check devices, each of said check devices comprising:

a drive structure fixed with respect to said one of said pair of first mounting structures and said pair of second mounting structures;

a pivot structure mounted for pivotal movement in opposing first and second directions relative to the other of said pair of first mounting structures and said pair of second mounting structures;

a biasing structure connected between the other of said pairs of mounting structures and said pivot structure, said biasing structure being constructed and arranged to apply a biasing force to said pivot structure to resist relative pivotal movement between pivot structure and the other of said pairs of mounting structures;

a clutch being movable between (a) an engaged position operatively coupling said drive structure and said pivot structure for movement together so that said biasing force resists relative movement between said pair of first mounting structures and said pair of second mounting structures by virtue of said drive structure being fixed with respect to said one of said pairs of mounting structures, said biasing force resisting relative pivotal movement between said pivot structure and the other of said pairs of mounting structures, and (b) a released position wherein said pivot structure is decoupled from said drive structure to enable said drive structure and said pivot structure to pivot relative to one another substantially free from resistance by said biasing force;

said biasing structure of said first check device applying its biasing force against a pivotal movement of said pivot structure relative to said one of said pairs of mounting structures in a direction corresponding to the closing direction of the door, said clutch of said first check device being constructed and arranged to remain in said engaged position as said first and second mounting structures are pivoted relative to one another in the direction corresponding to the closing direction of the door, said clutch responsively moving to said released position upon said first and second mounting structures being pivoted relative to one another a predetermined angular distance in the direction corresponding to the closing direction of the door against said biasing structure of said first check device;

said biasing structure of said second check device applying its biasing force against a pivotal movement of said pivot structure relative to said one of said pairs of mounting structures in a direction corresponding to the opening direction of the door, said clutch of said second check device being constructed and arranged to remain in said engaged position as said first and second mounting structures are pivoted relative to one another in the direction corresponding to the opening direction of the door, said clutch responsively moving to said released position upon said first and second mounting structures being pivoted relative to one another a predetermined angular distance in the direction corresponding to the opening direction of the door against said biasing structure of said second check device.

2. A door support system according to claim 1, wherein said clutch of said first one-way infinite check device is in said released position while said first and second mounting structures are stationary and is constructed and arranged to responsively move to said engaged position upon initiation of said first and second mounting structures in the direction corresponding to the closing direction of the door; and said clutch of said second one-way infinite check device is in said released position while said first and second mounting structures are stationary and is constructed and arranged to responsively move to said engaged position upon initiation of said first and second mounting structures in the direction corresponding to the opening direction of the door.

3. A door support system according to claim 1, wherein said drive structure of said first check device is fixed with respect to said pair of first mounting structures, wherein said pivot structure of said first check device is mounted for pivotal movement in opposing first and second directions relative to said pair of second mounting structures, and wherein said biasing structure of said first check device is connected between said pair of second mounting structures and said pivot structure, said biasing structure of said first check, device being constructed and arranged to apply a biasing force to said pivot structure to resist relative pivotal movement between pivot structure and said pair of second mounting structures.

4. A door support system according to claim 3, wherein said drive structure of said second check device is fixed with respect to said pair of first mounting structures, wherein said pivot structure of said second check device is mounted for pivotal movement in opposing first and second directions relative to said pair of second mounting structures, and wherein said biasing structure of said second check device is connected between said pair of second mounting structures and said pivot structure, said biasing structure of said second check device being constructed and arranged to apply a biasing force to said pivot structure to resist relative pivotal movement between pivot structure and said pair of second mounting structures.

5. A door support system according to claim 4, wherein said pivotally coupled first and second mounting structures include an upper pair of mounting structures defined by upper ones of said first and second pairs pivotally coupled together and a lower pair of mounting structures defined by lower ones of said first and second pairs pivotally coupled together;

said drive structure of said first check device being fixed to the second mounting structure of said upper pair, said pivot structure of said first check device being pivotally mounted to said first mounting structure of said upper pair, and said biasing structure of said second check device being connected between said first mounting structure of said upper pair and said pivot structure;

said drive structure of said second check device being fixed to the second mounting structure of said lower pair, said pivot structure of said second check device being pivotally mounted to said first mounting structure of said lower pair, and said biasing structure of said second check device being connected between said first mounting structure of said lower pair and said pivot structure.

6. A door support system according to claim 5, wherein each of said first and second check devices further comprises a housing, said housing of said first check device being fixed to said first mounting structure of said upper pair, and said housing of said second check device being fixed to the second mounting structure of said lower pair.

7. A door support system according to claim 6, wherein each of said biasing structures is a spiral spring, each of said spiral springs having a leg received within a groove in its associated housing and another leg received within a slot provided in its associated pivot structure so as to apply said biasing force to said pivot structure.

8. A door support system according to claim 1, wherein in each check device said pivot structure comprises a clutch hub and said drive structure comprises a clutch hub, said clutches of said door check devices being each being a torsion spring which in said engaged position frictionally embraces said clutch hubs to couple said clutch hubs, and in said disengaged position is spread to decouple said clutch hubs.

9. A door support system according to claim 6, wherein in each check device said pivot structure comprises a clutch hub and said drive structure comprises a clutch hub, said clutches of said door check devices being each being a torsion spring which in said engaged position frictionally embraces said clutch hubs to couple said clutch hubs, and in said disengaged position is spread to decouple said clutch hubs.

10. A door support system according to claim 8, wherein each of said housings has a groove on an interior thereof and wherein said torsion spring includes a tang member received within the grooves in the housing, the tang member being configured and positioned to deactivate the torsion spring, thereby uncoupling said clutch hubs.

11. A door support system according to claim 1, wherein said first mounting structures are body mounting brackets constructed and arranged to be mounted to the body and wherein said second mounting structures are door mounting brackets constructed and arranged to be mounted to the door.

12. The combination comprising:

a vehicle body;

a vehicle door; and a door support system for supporting the vehicle door on the vehicle body for movement in opposing opening and closing directions, said door support system comprising:

a door hinge system comprising (a) a pair of first mounting structures constructed and arranged to be mounted to one of the door and the body in spaced apart relation, and (b) a pair of second mounting structures constructed and arranged to be mounted to the other of the door and the body in spaced apart relation, said first mounting structures and said second mounting structures being pivotally coupled to support the door and provide for said movement of the door relative to the body in said opening and closing directions; and an infinite door check system comprising first and second one-way check devices, each of said check devices comprising:

a drive structure fixed with respect to said one of said pair of first mounting structures and said pair of second mounting structures;

a pivot structure mounted for pivotal movement in opposing first and second directions relative to the other of said pair of first mounting structures and said pair of second mounting structures;

a biasing structure connected between the other of said pairs of mounting structures and said pivot structure, said biasing structure being constructed and arranged to apply a biasing force to said pivot structure to resist relative pivotal movement between pivot structure and the other of said pairs of mounting structures;

a clutch being movable between (a) an engaged position operatively coupling said drive structure and said pivot structure for movement together so that said biasing force resists relative movement between said pair of first mounting structures and said pair of second mounting structures by virtue of said drive structure being fixed with respect to said one of said pairs of mounting structures, said biasing force resisting relative pivotal movement between said pivot structure and the other of said pairs of mounting structures, and (b) a released position wherein said pivot structure is decoupled from said drive structure to enable said drive structure and said pivot structure to pivot relative to one another substantially free from resistance by said biasing force;

said biasing structure of said first check device applying its biasing force against a pivotal movement of said pivot structure relative to said one of said pairs of mounting structures in a direction corresponding to the closing direction of the door, said clutch of said first check device being constructed and arranged to remain in said engaged position as said first and second mounting structures are pivoted relative to one another in the direction corresponding to the closing direction of the door, said clutch responsively moving to said released position upon said first and second mounting structures being pivoted relative to one another a predetermined angular distance in the direction corresponding to the closing direction of the door against said biasing structure of said first check device;

said biasing structure of said second check device applying its biasing force against a pivotal movement of said pivot structure relative to said one of said pairs of mounting structures in a direction corresponding to the opening direction of the door, said clutch of said second check device being constructed and arranged to remain in said engaged position as said first and second mounting structures are pivoted relative to one another in the direction corresponding to the opening direction of the door, said clutch responsively moving to said released position upon said first and second mounting structures being pivoted relative to one another a predetermined angular distance in the direction corresponding to the opening direction of the door against said biasing structure of said second check device.

13. The combination according to claim 12, wherein said clutch of said first one-way infinite check device is in said released position while said first and second mounting structures are stationary and is constructed and arranged to responsively move to said engaged position upon initiation of said first and second mounting structures in the direction corresponding to the closing direction of the door; and said clutch of said second one-way infinite check device is in said released position while said first and second mounting structures are stationary and is constructed and arranged to responsively move to said engaged position upon initiation of said first and second mounting structures in the direction corresponding to the opening direction.of the door.

14. The combination according to claim 12, wherein said drive structure of said first check device is fixed with respect to said pair of first mounting structures, wherein said pivot structure of said first check device is mounted for pivotal movement in opposing first and second directions relative to said pair of second mounting structures, and wherein said biasing structure of said first check device is connected between said pair of second mounting structures and said pivot structure, said biasing structure of said first check device being constructed and arranged to apply a biasing force to said pivot structure to resist relative pivotal movement between pivot structure and said pair of second mounting structures.

15. The combination according to claim 14, wherein said drive structure of said second check device is fixed with respect to said pair of first mounting structures, wherein said pivot structure of said second check device is mounted for pivotal movement in opposing first and second directions relative to said pair of second mounting structures, and wherein said biasing structure of said second check device, is connected between said pair of second mounting structures and said pivot structure, said biasing structure of said second check device being constructed and arranged to apply a biasing force to said pivot structure to resist relative pivotal movement between pivot structure and said pair of second mounting structures.

16. The combination according to claim 15, wherein said pivotally coupled first and second mounting structures include an upper pair of mounting structures defined by upper ones of said first and second pairs pivotally coupled together and a lower pair of mounting structures defined by lower ones of said first and second pairs pivotally coupled together;

said drive structure of said first check device being fixed to the second mounting structure of said upper pair, said pivot structure of said first check device being pivotally mounted to said first mounting structure of said upper pair, and said biasing structure of said second check device being connected between said first mounting structure of said upper pair and said pivot structure;

said drive structure of said second check device being fixed to the second mounting structure of said lower pair, said pivot structure of said second check device being pivotally mounted to said first mounting structure of said lower pair, and said biasing structure of said second check device being connected between said first mounting structure of said lower pair and said pivot structure.

17. The combination according to claim 16, wherein each of said first and second check devices further comprises a housing, said housing of said first check device being fixed to said first mounting structure of said upper pair, and said housing of said second check device being fixed to the second mounting structure of said lower pair.

18. The combination according to claim 17, wherein each of said biasing structures is a spiral spring, each of said spiral springs having a leg received within a groove in its associated housing and another leg received within a slot provided in its associated pivot structure so as to apply said biasing force to said pivot structure.

19. The combination according to claim 12, wherein in each check device said pivot structure comprises a clutch hub and said drive structure comprises a clutch hub, said clutches of said door check devices being each being a torsion spring which in said engaged position frictionally embraces said clutch hubs to couple said clutch hubs, and in said disengaged position is spread to decouple said clutch hubs.

20. The combination according to claim 17, wherein in each check device said pivot structure comprises a clutch hub and said drive structure comprises a clutch hub, said clutches of said door check devices being each being a torsion spring which in said engaged position frictionally embraces said clutch hubs to couple said clutch hubs, and in said disengaged position is spread to decouple said clutch hubs.

21. The combination according to claim 19, wherein each of said housings has a groove on an interior thereof and wherein said torsion spring includes a tang member received within the grooves in the housing, the tang member being configured and positioned to deactivate the torsion spring, thereby uncoupling said clutch hubs.

22. A The combination according to claim 12, wherein said first mounting structures are body mounting brackets constructed and arranged to be mounted to the body and wherein said second mounting structures are door mounting brackets constructed and arranged to be mounted to the door.

* * * * *